United States Patent [19]
Ueno et al.

[11] Patent Number: 5,742,709
[45] Date of Patent: Apr. 21, 1998

[54] DISPLAY PANEL FOR USE WITH AN IMAGE READING DEVICE

[75] Inventors: Osamu Ueno; Naoki Hiji, both of Kanagawa, Japan

[73] Assignee: Fuji Xerox Co., Ltd., Tokyo, Japan

[21] Appl. No.: 241,891

[22] Filed: May 13, 1994

[30] Foreign Application Priority Data

May 14, 1993 [JP] Japan .................. 5-135208

[51] Int. Cl.$^6$ .................................. G06K 9/00
[52] U.S. Cl. .......................... 382/321; 382/317
[58] Field of Search .................... 382/312, 313, 382/314, 315, 316, 317, 318, 319, 320, 321, 322, 323, 324, 112, 113, 114, 137, 138, 282, 283, 284, 287, 291; 358/488; 399/379, 376; 349/2, 3, 4, 5, 6, 141, 143, 30, 17, 27; 355/49, 57, 60, 65, 125, 129; 257/431, 443; 250/208.1

[56] References Cited

U.S. PATENT DOCUMENTS

| | | | |
|---|---|---|---|
| 5,161,233 | 11/1992 | Matsuo et al. | 355/218 |
| 5,220,445 | 6/1993 | Takenaka et al. | 359/72 |
| 5,241,616 | 8/1993 | Garcia | 385/126 |
| 5,349,174 | 9/1994 | Van Berkel et al. | 250/208.1 |

FOREIGN PATENT DOCUMENTS

| | | | |
|---|---|---|---|
| 63-501512 | 6/1963 | Japan | 382/312 |
| 55-6227 | 2/1980 | Japan | 382/312 |
| 58-25664 | 2/1983 | Japan | 382/312 |
| 59-30254 | 7/1984 | Japan | 382/312 |
| 60-14229 | 1/1985 | Japan | 382/312 |
| 63-271332 | 11/1988 | Japan | 382/312 |
| 3-52843 | 8/1991 | Japan | 382/312 |
| 3-219211 | 9/1991 | Japan | 382/312 |

*Primary Examiner*—Leo Boudreau
*Assistant Examiner*—Bijan Tadayon
*Attorney, Agent, or Firm*—Finnegan, Henderson, Farabow, Garrett & Dunner, L.L.P.

[57] ABSTRACT

An image reading device of the type in which a display panel is laid over a document table and an image on an original document is input through the display panel. In the image reading device, the display panel is a liquid crystal panel of the transmission type in which liquid crystal/polymer composite material is sandwiched by electrodes, and at least one of the electrodes sandwiching the liquid crystal/polymer composite material consists of a plurality of divided electrodes. Further, a gap between the adjacent divided electrodes is shorter than a minimum resolution distance in a location of the display panel of the image reading device. Alternatively, an electrode layer may be provided covering the gap between the adjacent divided electrodes in a state that an insulating layer is layered between the electrode layer and the gap. The ends of the divided electrodes may overlap with each other, with an insulating layer being layered therebetween. In this case, no gap is present between the adjacent divided electrodes. A distance t between the display panel and the document table is preferably $3\ mm \leq t \leq 30\ mm$.

13 Claims, 7 Drawing Sheets

LIGHT

DISPLAY PANEL FOR USE WITH AN IMAGE READING DEVICE

BACKGROUND OF THE INVENTION

1. Field of the Invention

The present invention relates to an image reading device used in an image reader section of a copying machine, a scanner, a facsimile device, or the like. More particularly, the invention relates to an image reading device in which a display structure utilizing liquid crystal/polymer composite material is provided on a part or the entire area of a document table, thereby presenting an intelligible display on the document table, which cannot be realized by the conventional technique, and hence remarkably lessening load of users.

2. Discussion of the Related Art

As shown in a rough sketch of an image reading device of FIG. 15, a conventional image reading device, such as a copying machine, a scanner, or a facsimile device, includes a document table 11 made of transparent material, for example, glass. An original document 10 is located on the document table 11, and exposed to light. An image on the original document 10 is read out of the document by using light reflected from the document.

In the conventional image reading device, when an original document is located on the document table, it is limited in an area where the document is located (referred frequently to as a document area) and the direction of the located document. The limitation depends largely on the type of the image reading device. Accordingly, an operator who is not accustomed to the operation of the device tends to make a mistake in locating the original. This results in an image read error.

Particularly in the image reading device of the copying machine, an image read area changes in accordance with the magnification or the size of paper used. High level functions, such as the automatic both-side copying function and the left or right side stitching function, when they are used, make it complicated to locate the original on the document table. In the case of a scanner, when an original document is located upside down on the document table, an image on the original is read in an inverted fashion. Thus, great care is used for locating the original.

Some proposals to solve the problems have been made.

A first example of the proposals is a platen device for a copying machine disclosed in Japanese Patent Examined Publication No. Sho. 55-6227. In the platen device, liquid crystal is interposed between the electrodes. When a voltage is applied to between the electrodes, the liquid crystal in the portion receiving the voltage becomes opaque. This nature is utilized to automatically indicate an area where an original document is to be located on the document table.

A second example of the proposals is a copy area indication device disclosed Japanese Patent Examined Publication No. Sho. 59-30254. In the copy area indication device, light emitting diodes (LEDs) are arrayed on the periphery of a document table. Corresponding to the document area, LEDs are lit on to indicate a copy area on the document table in accordance with the paper size and the magnification. With the indication by the LEDs, a user can place a sheet of paper of correct size, not excessively large or small, on the document table.

A third example of the proposals is a sheet size indication device for an image recording machine disclosed in Japanese Patent Unexamined Publication No. Sho. 60-14229. The sheet size indication device is constructed such that an image recording machine in which an original document is exposed to light through the movement of an exposure lamp under and along a platen glass, includes a size indication sheet arranged such that it is unrolled and extended so as to cover the under side of the platen glass when the exposure lamp is stopped and is rolled up into a given sheet storage portion. A plurality of dots or lines indicating the sheet sizes are marked on the upper side of the platen glass. Light emitting means, selectively lit on, is provided in connection with the plurality of sheet size marks on the size indication sheet. Since the sheet size indication device is thus constructed, a copy size and a document size can easily be read, and the four sides of the document can be exactly set to the reference sides.

A fourth example of the proposals is a document mask device disclosed in Japanese Patent Unexamined Publication No. Sho. 58-25664. The document mask device is constructed such that a liquid crystal panel, divided into many liquid crystal panels, is laid on a document table made of transparent material, such as glass, and a transparent area is partially formed by selectively applying a variable voltage to the plurality of liquid crystal panels, thereby shutting off light to the other area than the document read area. In this device, a medium voltage is applied to the liquid crystal panels to be masked, so that transmitting light is controlled to set up a blur state in the mask area of the document.

A fifth example of the proposals is a copying machine disclosed in Japanese Patent Unexamined Publication No. Sho. 63-271332. In the copying machine, a liquid crystal display panel is provided on a document table of glass. In a non-display mode, the display panel allows light to transmit therethrough. In a display mode, the display panel displays information on machine operations and the like. When a copying operation starts or a trouble occurs during a copying operation, the liquid crystal display panel displays information about operations. After a document is placed on the document table, the display panel allows light to transmit therethrough. The operation of copying the document is performed.

The typical transmission type display panel is a liquid crystal rheostat display device disclosed in Japanese Patent Unexamined Publication No. Hei. 3-219211. The liquid crystal rheostat display device includes a pair of conductive substrates at least one of which is transparent, and a rheostat layer, sandwiched by the paired conductive substrates, containing liquid crystal and polymer. In the display device, a transparent state is switched to an opaque state and vice versa by an electric field applied. Other known transmission type display panels are transmission type display panels using liquid crystal/polymer composite material, disclosed in Japanese Patent Examined Publication No. Hei. 3-52843 and Japanese Patent Unexamined Publication No. Sho. 63-501512.

In the case of the platen device for a copying machine as the first example, the transmittance of the liquid crystal is 50% at most. Because of this, the read sensitivity essential to the device is greatly reduced, and the utility of the device is poor.

The conventional copy area indication device of the second example can roughly indicate a document area, but cannot specify the direction of a document located when a high level read function, such as the automatic both-side copying function, is used. Therefore, it is difficult to recognize the document area.

In the conventional sheet size indication device of the third example, a size indication sheet with sheet size marks is mechanically unrolled and extended under the lower side of the document table, thereby to indicate document areas. This mechanical operation impedes the indication of the document area to make it slow.

In the conventional document mask device of the fourth example and the conventional copying machine of the fifth example, since the conventional transmission type liquid crystal panel using the sandwiched liquid crystal material is used, the transmittance is low and the device utility is poor.

In the case of the transmission type liquid crystal display panel using liquid crystal/polymer composite material in the liquid crystal rheostat display device disclosed in Japanese Patent Unexamined Publication No. Hei. 3-219211, when a voltage is applied, a higher transmittance of the display panel is gained than that of the conventional liquid crystal display panel. However, it suffers from the following disadvantage. If this transmission type display panel is used like the display panel of the copying machine of the fifth example, no voltage is constantly applied to the gaps each between the divided electrodes of the transmission type display panel, which uses liquid crystal/polymer composite material. Therefore, light is scattered at the gaps, thereby to render the gaps opaque. Since the opaque gaps are interruptive in the operation of reading an image, the device misses out a part or parts of an image when reading the image. The transmission type display panels using the liquid crystal/polymer composite material disclosed in Japanese Patent Examined Publication No. Hei. 3-52843 and Japanese Patent Unexamined Publication No. Sho. 63-501512 also suffers from the same problems.

SUMMARY OF THE INVENTION

The present invention has been made in view of the above circumstances and has an object to provide an image reading device having a display structure which is operable at high speed without deteriorating a read sensitivity, and enables a user to correctly recognize the information, such as document areas, and which can completely read an image on the document, not missing out a part or parts of the image during the image reading operation.

In order to attain the above object, the invention provides an image reading device of the type in which a display panel is laid over a document table and an image on an original document is input through the display panel, wherein the display panel is a liquid crystal panel of the transmission type in which liquid crystal/polymer composite material is sandwiched by electrodes, at least one of the electrodes sandwiching the liquid crystal/polymer composite material comprises a plurality of divided electrodes, and a gap between the adjacent divided electrodes is shorter than a minimum resolution distance in a location of the display panel of the image reading device.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

The preferred embodiment of the present invention will be described with reference to the accompanying drawings.

Figure 1:
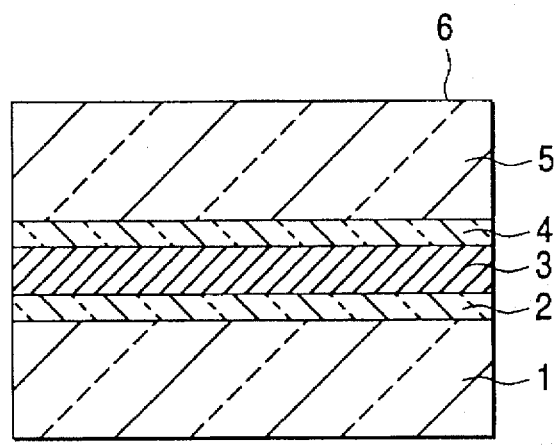
FIG. 1 is a cross sectional view showing a display structure of a document table in an image reading device according to an embodiment of the present invention.

FIG. 1 is a cross sectional view showing a display structure of a document table in an image reading device according to an embodiment of the present invention.

The display structure (display panel) of the document table according to the preferred embodiment is constructed using liquid crystal/polymer composite material. The display structure, as shown in FIG. 1, includes a lower transparent electrode layer 2 layered on the lower side of a display layer 3, an upper transparent electrode layer 4 layered on the upper side of the display layer 3, a lower holding layer 1 layered on the lower side of the lower transparent electrode layer 2, and an upper holding layer 5 layered on the upper side of upper transparent electrode layer 4. The display layer 3 is made of liquid crystal/polymer composite material. The upper and lower transparent electrode layers 4 and 2 are made of transparent electrode material, for example, indium tin oxide (ITO). The lower holding layer 1 and the upper holding layer 5 are made of light transmission material, for example, glass, resin of polyethylene terephtalate (PET), or the like. The upper surface of the upper holding layer 5 serves as a document receiving surface 6 on which a document is located.

If required, resin material of polyethylene, for example, may be inserted between the lower transparent electrode layer 2 and the lower holding layer 1, and between the upper transparent electrode layer 4 and the upper holding layer 5. When resin material underlies the lower transparent electrode layer 2, the lower holding layer 1 may be omitted. In this case, the lower transparent electrode layer 2, the display layer 3, the upper transparent electrode layer 4, and the resin material sandwiching the combination of those layers are formed into a one-piece structure. The structure is bonded to the upper holding layer 5, whereby a display structure of the transmission type (transmission type liquid display panel) is formed.

The liquid crystal/polymer composite material is a mixture of liquid crystal material and polymer material, and typically NCAP (nematic curvilinear aligned phase), PDLC (polymer dispersed liquid crystal), PNLC (polymer network liquid crystal), or the like.

The thickness of each of the upper holding layer 5 and the lower holding layer 1 is usually 10 µm to 10 mm, preferably approximately 0.1 mm to 6 mm. The thickness of the display layer 3 is usually 1 µm to 100 µm, preferably approximately 10 µm to 50 µm. The thickness of each of the upper transparent electrode layer 4 and the lower transparent electrode layer 2 is usually 5 nm to 500 nm, preferably approximately 10 nm to 200 nm.

The upper and lower transparent electrode layers 4 and 2 may be formed respectively on the upper and lower holding layers 5 and 1 by a normal thin film forming method, such as a sputtering method or a vapor deposition method. The display layer 3 may be formed in a manner that a mixture of liquid crystal being in a liquid state and polymer, is flown to between the upper and lower transparent electrode layers 4 and 2, and the polymer is hardened by heating or ultra violet rays.

Since the display structure of the present embodiment is formed not using a deflection plate, which is essential to the conventional liquid crystal display, a transmittance thereof in a state that a voltage is applied thereto is high, 80% or more. Accordingly, the display structure can be satisfactorily used as a document table for reading an image on an original document. Normally, an original document is located on the document receiving surface 6 of the upper holding layer 5. If required, an additional document table may be used. In this case, the display structure according to this embodiment is attached to the document table.

Figure 2:
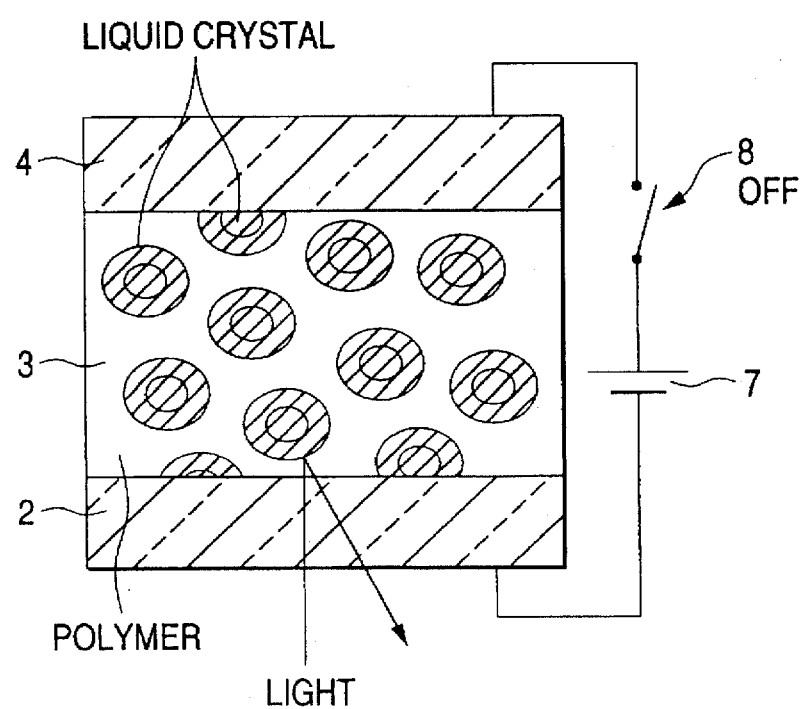
FIG. 2 is a cross sectional view for explaining the operation principle of the display layer in the display structure shown in FIG. 1.
Figure 3:
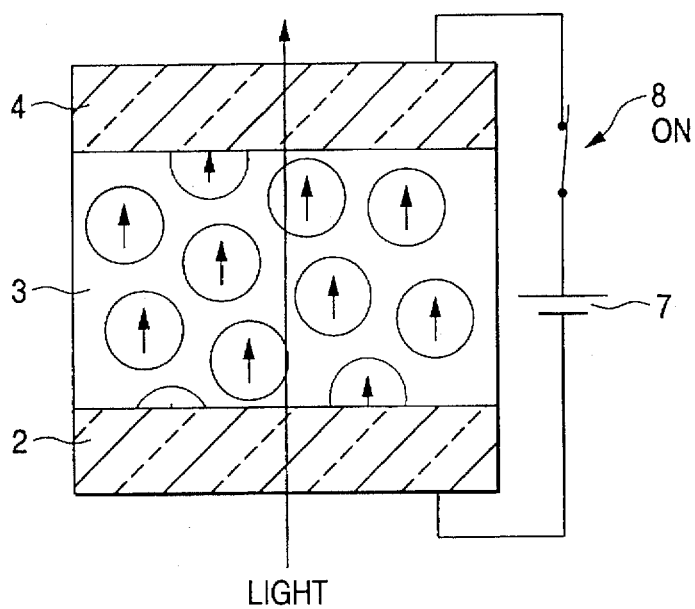
FIG. 3 is another cross sectional view for explaining the operation principle of the display layer.

The operation principle of the display layer in the display structure of the embodiment will be described with reference to FIGS. 2 and 3. FIGS. 2 and 3 are cross sectional views for explaining the operation principle of the display layer in the display structure of the embodiment. As shown in FIGS. 2 and 3, the display structure of the embodiment includes a power source 7 for applying a DC voltage to the upper transparent electrode layer 4 and the lower transparent electrode layer 2, and a switch 8 for turning on and off the application of the DC voltage.

In an OFF state of the switch where no voltage is applied from the power source to the display layer 3, the liquid crystal molecules, which are dispersed in the polymer as shown in FIG. 2 of the display layer 3 made of liquid crystal/polymer composite material, are randomly oriented under the influence of the interface, thermal vibration, and the like. In this state, if the display layer is exposed to light, light is scattered and the display layer becomes opaque.

In an ON state of the switch where a voltage is applied from the power source to the display layer 3, the liquid crystal molecules are oriented in the direction of an electric field, as shown in FIG. 3. In this state, the display layer allows light to transmit therethrough.

In the illustration of FIGS. 2 and 3, the power source 7 is the DC power source, but may be an AC power source. To secure a longer lifetime of the display panel, the AC power source is superior to the DC power source.

To display information, the liquid crystal/polymer composite material that is thus operated is divided into a number of pixels, and these pixels are selectively rendered transparent. An example of dividing the liquid crystal/polymer composite material into a number of pixels is illustrated in the plan view of FIG. 4. In the example, the upper transparent electrode layer 4 and the lower transparent electrode layer 2 are divided into strip-like pieces. The strip-like pieces of the upper transparent electrode layer 4 are arrayed so as to be perpendicular to those of the lower transparent electrode layer 2. The intersections formed by the strip-like pieces are used as rectangular pixels.

In a display structure of A3 size (approximately 420×300 mm), for example, if strip-like electrodes each of 5 mm wide are arrayed in a matrix of 84×60, one pixel of approximately 5 mm×5 mm can be formed.

Figure 4:
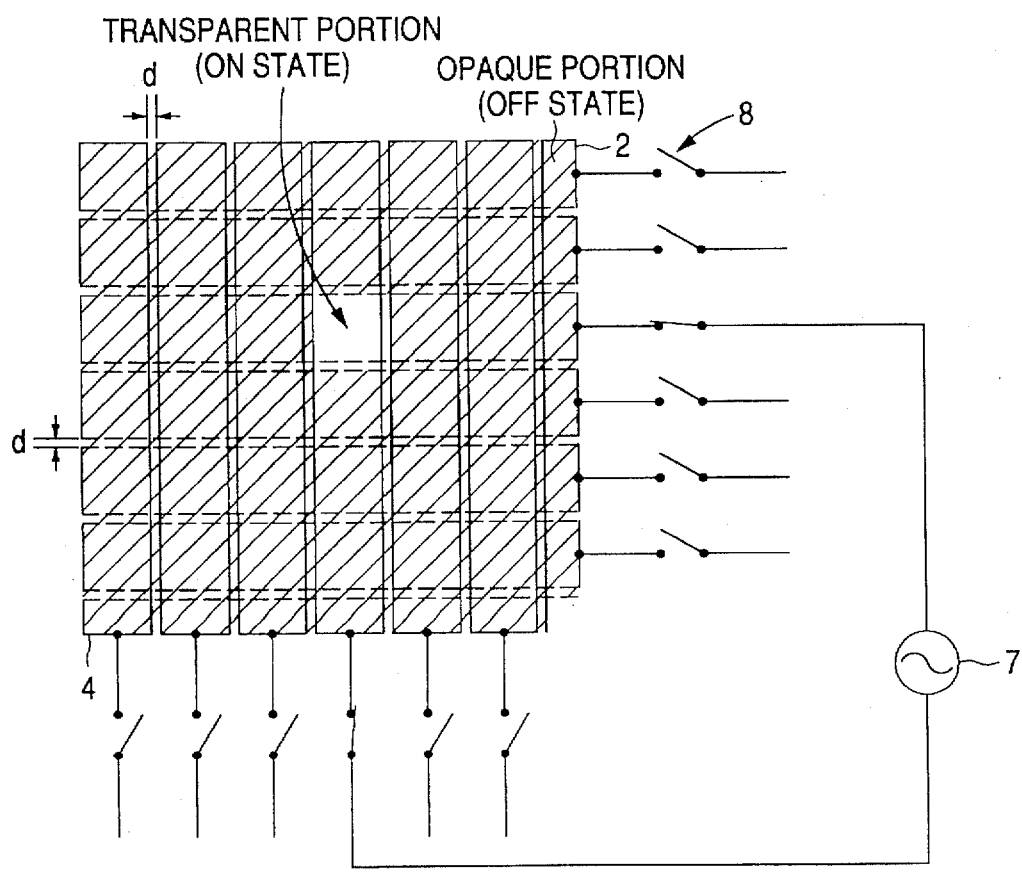
FIG. 4 is a plan view showing an array of pixels coupled with a drive circuit thereof, the pixels being formed by dividing the liquid crystal/polymer composite material.

When one of the strip-like electrodes of the upper transparent electrode layer 4 and one of those of the lower transparent electrode layer 2 are selected and a voltage is applied to the selected strip-like electrodes, one pixel as shown in FIG. 4 is conditioned so as to allow light to transmit therethrough, so that the pixel is rendered transparent. When a plurality of the strip-like electrodes are simultaneously selected and a voltage is applied to them, those pixels are rendered transparent. If the electrodes are switched at time intervals each shorter than the after image time of human eyes, complicated patterns such as character information may be displayed. In the illustration of FIG. 4, the power source 7 is the AC power source, but may be a DC power source.

One method of dividing the upper and lower transparent electrode layers 4 and 2 into strip-like electrodes is a method of mechanically cutting out the transparent electrode layers. Another method for forming those strip-like electrodes is to coat the transparent electrode layers with photo resist, to optically pattern them, and to develop and etch them.

In the image reading system of 400 spi, a distance between one strip-like electrode and another strip-like electrode adjacent to the former is preferably 20 µm or shorter, usually 5 to 10 µm.

In the display structure of the image reading device according to the present embodiment, a gap d is present between the adjacent pixels. The gap d is smaller than a minimum resolution distance in the image reading device, preferably smaller than ½ of the minimum resolution distance of the image reading device. The term "minimum resolution distance" means a minimum distance between two points that is required for discriminately reading the two points. More exactly, the minimum resolution distance is expressed by the reciprocal of a resolution. The term "resolution" means the number of line pairs (black and white stripes arrayed at equal pitches) per mm. Where the resolution of an optical system is 24 line pairs/m, for example, the minimum resolution distance is 42 µm. The "gap between the adjacent strip-like electrodes" in the image reading device of the embodiment is smaller than 42 µm, preferably 20 µm or smaller. If it is within a range from 5 to 10 µm, no problems arise. As a generalization, when the resolution of the image reading device is a d number of line pairs/mm, the "gap between the adjacent strip-like electrodes" is set to be 1/d µm or shorter. In addition, the minimum resolution distance in the invention may be defined in connection with an MTF (Modulation Transfer Function) of the optical system. Specifically, when the MTF is small enough, the minimum resolution distance may be defined as a reciprocal of the spacial frequency of the input image in which the MTF of 5% is gained, for example.

When an area where a document is located is apart from a display layer, the display layer is apart from the focal position of the image reading optical system. As a result, the minimum resolution distance is somewhat longer than that at the document position.

Figure 13:
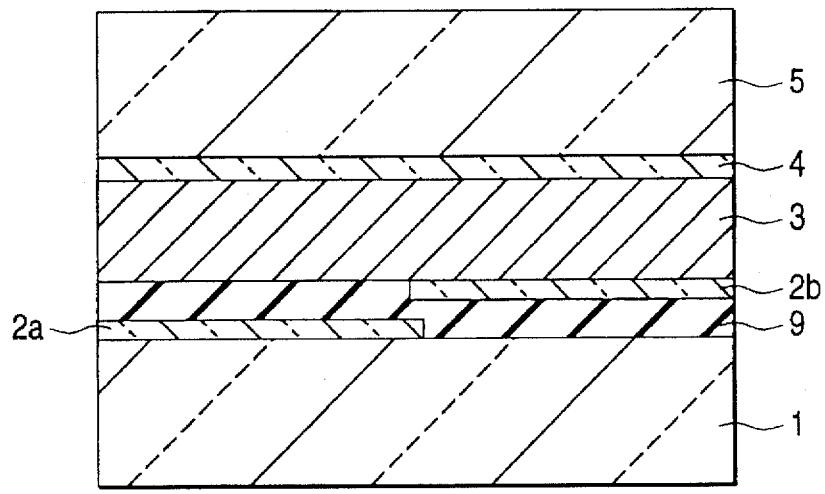
FIG. 13 is a cross sectional view showing a display structure according to a second embodiment of the present invention.
Figure 14:
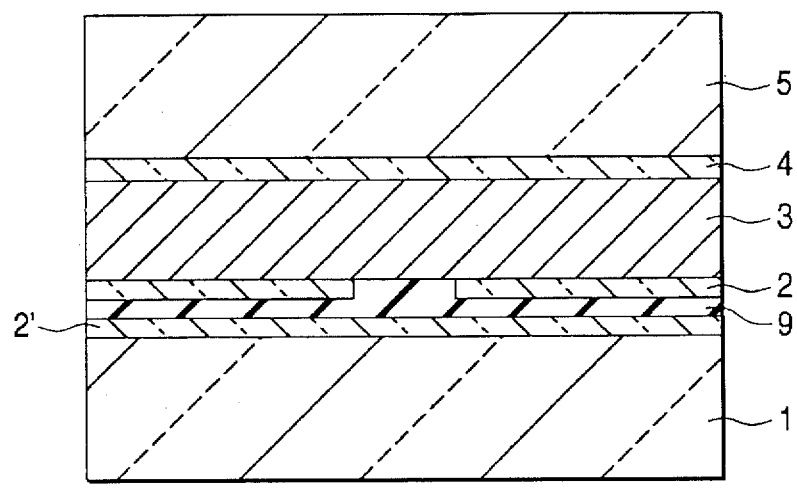
FIG. 14 is a cross sectional view showing another display structure according to the second embodiment of the present invention.
Figure 15:
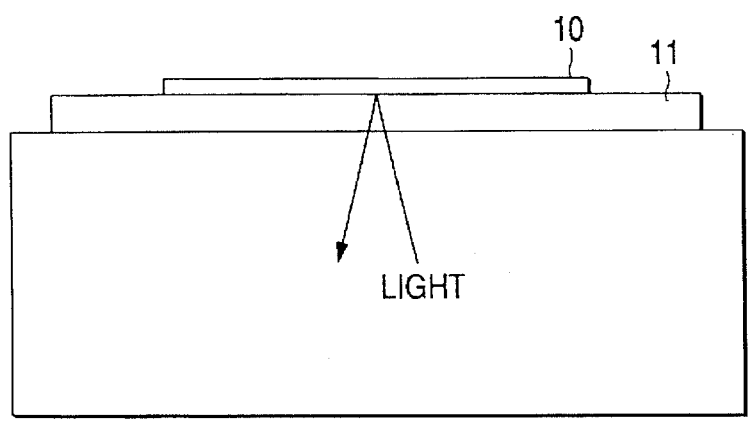
FIG. 15 is a view showing a conventional image reading device.

Further, a display structure of an image reading device according to another embodiment (second embodiment) will be described with reference to FIGS. 13 and 14. FIG. 13 is a cross sectional view showing a display structure according to the second embodiment of the present invention. FIG. 14 is a cross sectional view showing another display structure according to the second embodiment of the present invention.

The display structure of the second embodiment is characterized in that the strip-like electrodes are arrayed such that the ends of the adjacent strip-like electrodes overlap with each other when vertically viewed, thereby eliminating the gaps between the strip-like electrodes. To be more specific, as shown in FIG. 13, the lower transparent electrode layer 2 consists of two layers, lower transparent electrode layers 2a and 2b, with an insulating layer 9 layered therebetween, and the adjacent electrode layers consist of different electrodes alternately arrayed, and the ends of the adjacent electrode layers 2a and 2b overlap with each other in a state that the insulating layer 9 is layered therebetween. With this structure, no opaque area appears when an image is read, so that the device never misses out a part or parts of an image when it reads the image. In this instance of the embodiment, the lower transparent electrode layer 2 is constructed to have the double layered structure. If necessary, the upper transparent electrode layer 4 may also be constructed to have the double layered structure.

In a method of manufacturing the display structure of FIG. 13, ITO is layered on the lower holding layer 1, and patterned by photolithography technique, for example, thereby forming the lower transparent electrode layer 2a. Inorganic insulating material, such as $SiO_2$, SiNx, or the like, is formed on the electrode layer, thereby to form the insulating layer 9. ITO is layered on the insulating layer and patterned by photolithography, for example, thereby forming the lower transparent electrode layer 2b. The structure is formed so that the end of the lower transparent electrode layer 2a overlaps with the end of the lower transparent electrode layer 2b. The upper transparent electrode layer 4 is formed on one side of the upper holding layer 5, the upper and lower holding layers 5 and 1 are made to approach to each other, liquid crystal/polymer composite material is flown to between the upper and lower transparent electrode layers 4 and 2 and hardened, thereby forming the display structure as shown in FIG. 13.

Another display structure according to the second embodiment will be described with reference to FIG. 14. In this display structure, as shown, gaps among the individual strip-like electrodes are left as they are. Another lower transparent electrode layer 2' is formed under the gap in a state that an insulating layer 9 is layered therebetween. With this structure, a voltage is applied to every part of the display layer 3. To be more specific, ITO is layered on the lower holding layer 1, and patterned by photolithography technique, for example, thereby forming a pattern of the lower transparent electrode layer 2'. Then, inorganic insulating material, such as $SiO_2$, SiNx, or the like, is formed on the electrode layer, thereby to form the insulating layer 9. Further, ITO is layered on the insulating layer and patterned by photolithography, for example, thereby forming the lower transparent electrode layer 2. The subsequent manufacturing process of the display structure is similar to that referred to in connection with FIG. 13.

The additional lower transparent electrode layer 2' is electrically controlled so that when a voltage is applied to both adjacent strip-like electrodes of the lower transparent electrode layer 2, a voltage is also applied to the electrode layer 2', simultaneously. Thus, the lower transparent electrode layer 2' functions to apply the voltage to the portions of the display layer 3, which correspond to the gaps among the strip-like electrodes in the display layer 3. In FIG. 14, another upper transparent electrode layer may be formed in connection with the strip-like electrodes of the lower transparent electrode layer 2, in addition to those of the upper transparent electrode layer 4.

Further, a display structure of an image reading device according to an additional embodiment (third embodiment) of the present invention will be described.

In the image reading device of the third embodiment, a display structure is composed of a lower holding layer 1, made of PET, of approximately 120 µm thick, a lower transparent electrode layer 2, made of ITO, of approximately 30 nm thick, a display layer 3 of approximately 20 µm thick made of liquid crystal/polymer composite material, an upper transparent electrode layer 4, made of ITO, of approximately 30 nm thick, and an upper holding layer 5, made of PET, of approximately 120 µm thick. The display structure was located above a glass platen (distance t between the document receiving surface and the display layer 3 was approximately 0.1 mm.). The same was located under a platen glass of 3 mm thick (the distance t was approximately 3 mm.). The display structures were tested for evaluation of their characteristics, by varying the distance t between the document receiving surface and the display layer 3. The results of the test were as shown in Table 1.

TABLE 1

| t (mm) | Masking Ability | Position Recognition Ability |
|---|---|---|
| 0.1 | Δ | ⊚ |
| 3 | ○ | ⊚ |
| 5 | ○ | ⊚ |
| 10 | ⊚ | ⊚ |
| 20 | ⊚ | ○ |
| 30 | ⊚ | ○ |
| 50 | ⊚ | x |

In the above table, the "masking ability" means a degree of masking an image on a document when the image is read in a state that the panel of the display structure remains opaque. "⊚" indicates a satisfactory masking ability; "o", a masking ability for masking the character document) "Δ", a masking ability to such an extent as to mask soils on the platen cover; and "x", an extremely poor masking ability.

The "position recognition ability" means a sensory evaluation ability indicative of a degree of recognition by an operator when he recognizes information, for example, a document position indicated on the panel of the display structure. "⊚" indicates that most of operators can correctly recognize information; "o", that many operators can correctly recognize information; and "x", that many operators incorrectly recognize information.

As seen from Table 1, as the distance t between the document receiving surface and the display layer 3 increases, the masking ability increases, but the position recognition ability decreases. Accordingly, in the image reading device of the third embodiment, the distance t is within a range of approximately 3 mm to 30 mm, preferably approximately 10 mm.

Since the masking ability varies depending on the compositions and the thickness of the liquid crystal/polymer composite material used, its optimum value varies. When the distance t increases, the scattering effect by the liquid crystal/polymer composite material increases, so that the masking ability increases.

When the distance t is increased, the position of the display layer 3 is apart from the focal point of the image read optical system of the image reading device. Accordingly, increase of the distance t brings about such an advantage that the electrode-to-electrode gap can be reduced.

Figure 5:
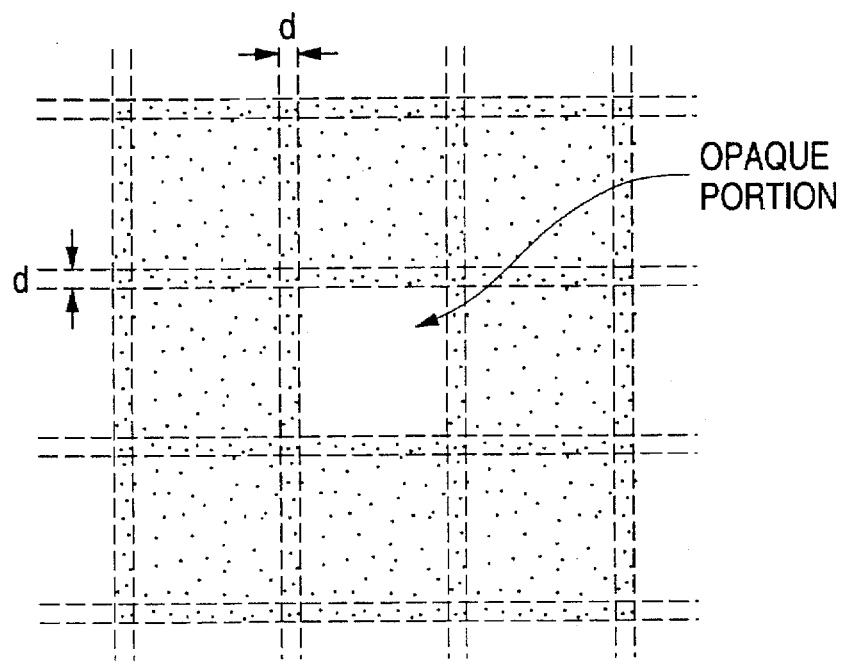
FIG. 5 is an explanatory diagram showing an example of the result of copying a soiled document table cover.

FIG. 5 shows an example of the result of copying a soiled document table cover in a state that only a central portion is opaque by applying no voltage thereto and the remaining portion is transparent by applying a voltage thereto. As seen from FIG. 5, no soil is read in the portion made opaque (opaque portion). Accordingly, in the case of a small original document, for example, if the portion other than the original is made opaque, unwanted soils can be eliminated from the read image. The reason why soils on the document table cover are not read in the opaque portion is that in the opaque portion, light is scattered, so that soil images are blurred and perceived uniformly white. Since the transmittance of the opaque portion is reduced, a user is not in the glare of light from the light source during the copying operation even if the document table cover is not used.

The reflectivity of the opaque portion may be controlled by varying those parameters, such as the particle diameter and density of the liquid crystal dispersed, the refractivities of the liquid crystal and polymer, and the thickness of the display layer 3. Therefore, if the refractivity of the opaque portion is increased to provide a quantity of reflecting light in excess of a read threshold value of the white portion (a minimum quantity of light enabling one to perceive the white portion), the opaque portion can be perceived as a white document without using the document table cover.

Examples of display patterns by the display structure of the first embodiment will be described with reference to FIGS. 6 through 10. The display structures of the second and third embodiments of the invention as well as the display structure of the first embodiment are also able to display like patterns.

Figure 6:
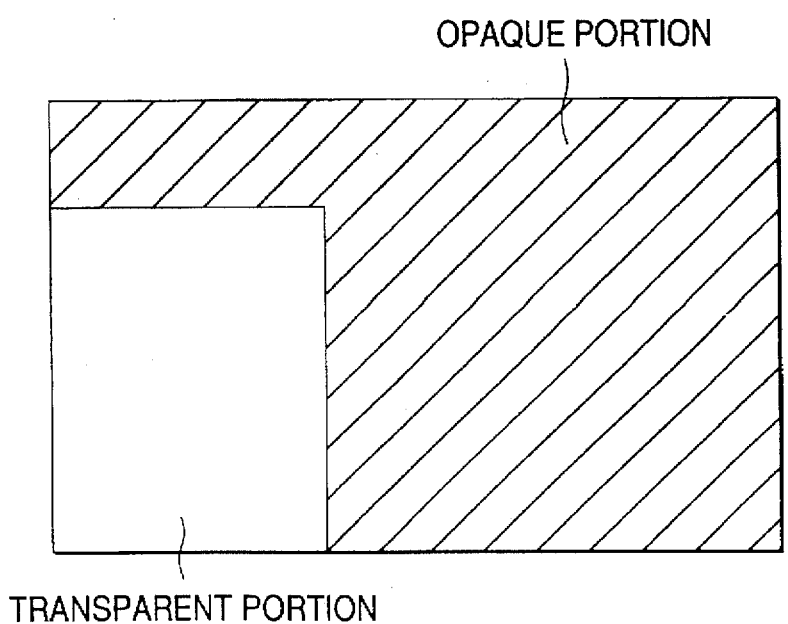
FIG. 6 is an explanatory diagram showing an example of a display pattern of an area where a document is located, which is presented by the display structure.

FIG. 6 is an explanatory diagram showing an example of a display of an area where a document is located. An area necessary for reading an image on an original document is rendered transparent by applying a voltage to between the lower transparent electrode layer 2 and the upper transparent electrode layer 4, thereby forming a transparent portion in the document receiving surface 6. For the remaining area, no voltage is applied to between the upper and lower transparent electrodes, thereby rendering the area opaque, thereby forming an opaque area. When the display structure of the present embodiment is applied to a copying machine, after the size of paper used, magnification, right or left stitching, and the like are specified, a voltage is selectively applied to between the strip-like electrodes of the upper and lower transparent electrodes. A read area set up according to the thus specified items is formed by a transparent portion and an opaque portion, and is used as a display area.

Figure 7:
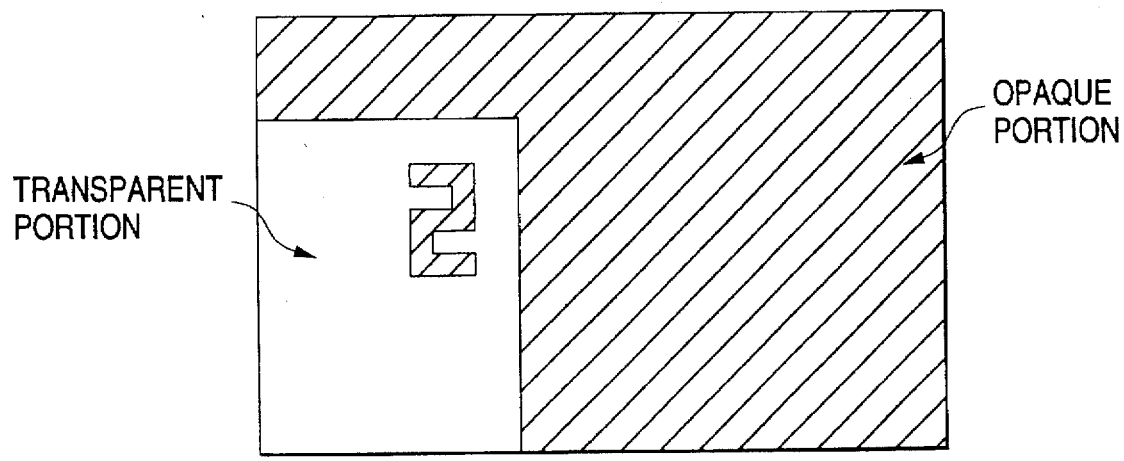
FIG. 7 is a diagram showing a display pattern by the display structure when it is applied to a copying machine.

FIG. 7 is an explanatory diagram showing an example of a display pattern by the display structure when it is applied to a copying machine. In this example, a document area is displayed on the document receiving surface 6, and the number of copies, for example, is also displayed by the opaque portion. When the copying operation is performed, information indicative of the number of copies displayed in the transparent portion is made transparent by applying a voltage to between the upper and lower transparent electrodes in this opaque portion. Accordingly, the opaque portion does not affect any influence to the image reading operation.

Figure 8:
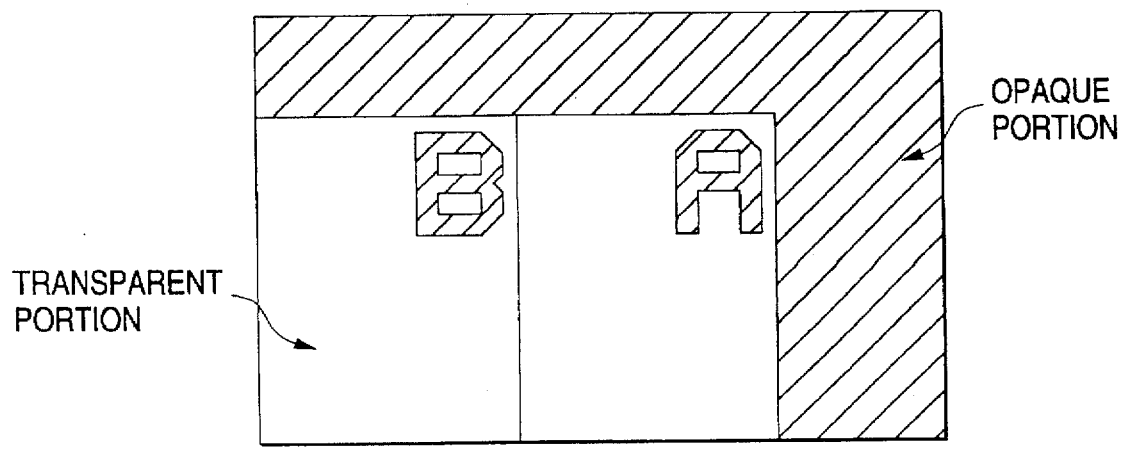
FIG. 8 is a diagram showing another display pattern by the display structure when it is applied to a copying machine.

FIG. 8 is an explanatory diagram showing another example of a display pattern by the display structure when it is applied to a copying machine. The copying machine has the function to copy images on a spread document on two separate sheets of paper or on both sides of a sheet of paper. When this function is executed, the information indicative of the document area and the copying order, first (A) and second (B), is displayed in order to make it easy to locate the document. Also in the case of FIG. 8, the information indicative of the obverse (A) of a copy and the reverse (B) is removed when the copying operation is performed.

Figure 9:
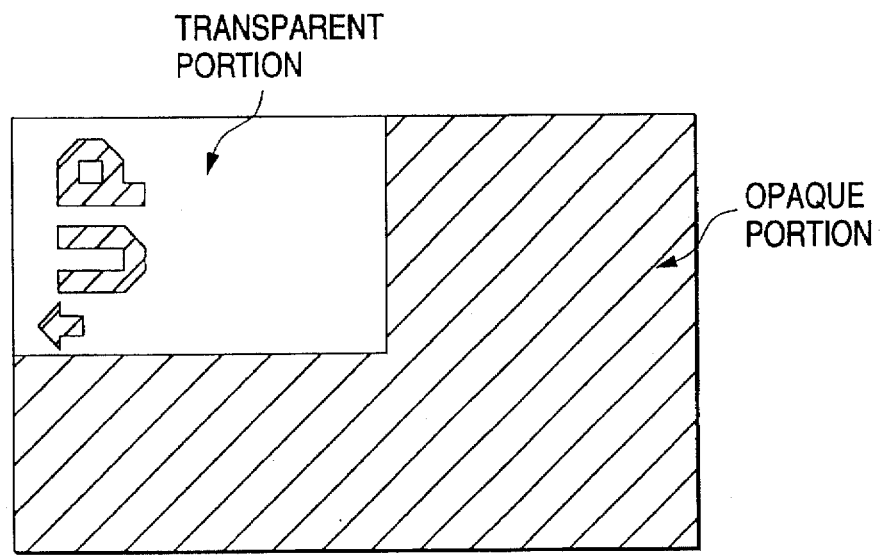
FIG. 9 is a diagram showing a display pattern by the display structure when it is applied to a scanner.

FIG. 9 is an explanatory diagram showing another example of a display pattern by the display structure when it is applied to a scanner. In this case, a document read area is displayed using the transparent portion and the opaque portion, and information indicative of the direction of a document located is displayed in terms of characters and like. The information, such as characters, are also expressed using the opaque portions, and are removed when the image read operation is performed.

Figure 10:
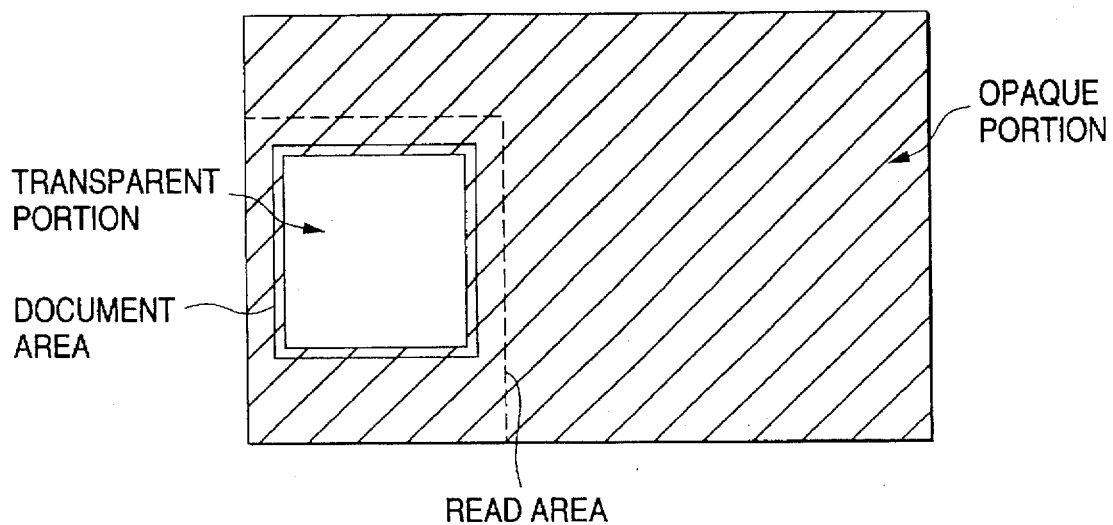
FIG. 10 is an explanatory diagram showing an example of a display pattern by the display structure when a document is small relative to the image read area.

FIG. 10 is an explanatory diagram showing an example of a display pattern by the display structure when a document is small relative to the image read area. When this display pattern is used, if the document table cover has soils, it is possible to prevent the image reading device from reading soils on the document table cover. In a case where the reflectivity of the opaque portion is high, that is, a quantity of reflecting light in the opaque portion is in excess of the threshold value in the white portion, it is possible to prevent the image reading device from reading unnecessary portions even if the document table cover is not used.

Figure 11:
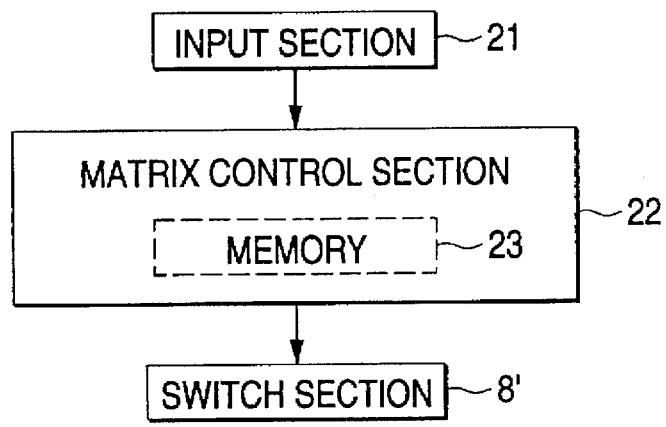
FIG. 11 is a block diagram showing a control circuit for realizing display patterns.

To form the display patterns as referred to above, a control circuit shown in FIG. 11 is required. FIG. 11 is a block diagram showing the arrangement of a control circuit for forming the display patterns.

The control circuit, as shown in FIG. 11, includes an input section 21 as an input means and a matrix control section 22 as a control means. The matrix control section 22 outputs signals for turning on and off a plurality of switches 8 shown in FIG. 4 (all the switches are represented by a switch section 8'). The matrix control section 22 contains a memory 23 for storing the information indicative of paper sizes for operation modes or the direction/orientation in which a document is located, and the like. In response to input signals from the input section 21, related information is read out of the memory 23 and the corresponding pattern signals are output to the switch section 8'. The pattern signals form a transparent portion and an opaque portion in the display structure so as to indicate the document area or the direction/orientation of the document.

When an operation mode instruction is input to the input section 21, the input section 21 produces a signal indicative of the operation mode. In response to the signal, the matrix control section 22 operates for control to drive the switch section 8', so that the display structure as the transmission type liquid crystal display panel displays the operation mode. In other words, the control circuit of FIG. 11 serves as a display control means for causing the display panel to display an operation mode. Further, an instruction to the input section 21 causes the display panel to display the corresponding copy area. In this respect, the control circuit serves also as a display control means causing the display of a copy area.

In the image reading device of the embodiment, the display structure displays the document area or the direction/orientation of the document using the combination of the transparent and opaque portions, and additional information assisting a user in locating documents. Accordingly, the image reading device enables the user to correctly locate documents on the document table even in a complicated read operation.

Since the image reading device does not use the deflection plate, which is essential to the conventional liquid crystal display device, the transmittance is large, so that the read sensitivity is high. Since the separate portions, transparent portion and opaque portion, are used for display, the display is excellently perceived and provides an exact visual presentation. Soils on the document table cover are read uniformly white in the opaque portion. This feature eliminates the influence by soils.

The image reading device of the present embodiment, which uses the liquid crystal/polymer composite material, switches the display at a higher speed than that of the conventional liquid crystal display device. Accordingly, the image reading device is able to transmit information and to carry out the display process at a higher speed.

In the image reading device of the embodiment, the gap between the adjacent pixels in the display structure is smaller than the minimum resolution distance of the image reading device. Therefore, the image read operation progresses without any influence by the pixel-to-pixel gaps. The resultant read image is beautiful.

In the image reading device of the embodiment, the quantity of reflecting light when no voltage is applied to the display layer 3 made of liquid crystal/polymer composite material, is larger than the threshold value in the white portion. With this feature, the unnecessary portion can be read as a white portion without reflecting light by the document table cover. Accordingly, the read image can be kept clean. In the case of the copying machine incorporating the display structure, there is eliminated an excessive toner consumption.

Figure 12:
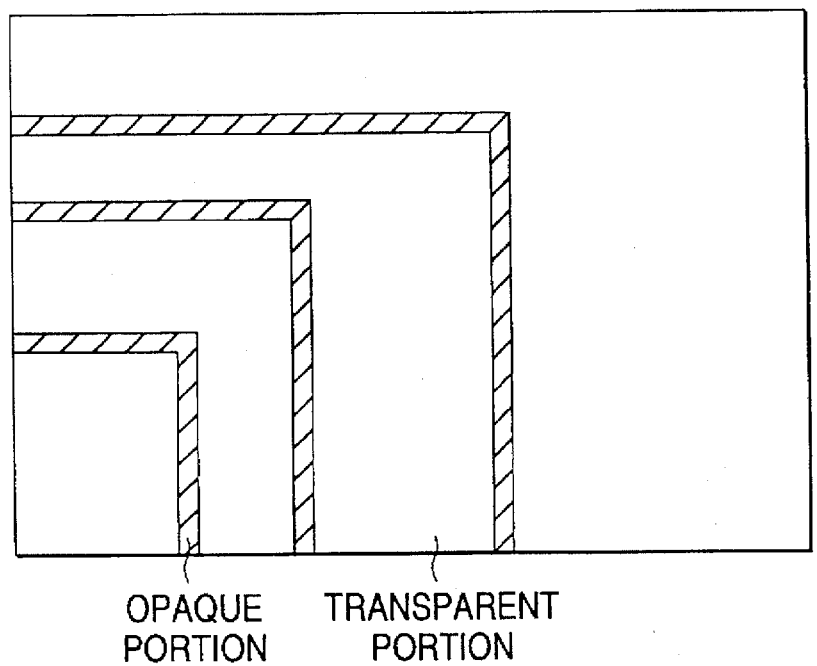
FIG. 12 is a diagram showing simple display patterns delineating paper sizes.

In the present embodiment, strip-like electrodes, which are formed by dividing the lower transparent electrode layer 2 and the upper transparent electrode layer 4, are arrayed in a matrix fashion. In a simple construction, the areas defining paper sizes on the display panel are delineated by linear opaque portions, as shown in a plan view of FIG. 12. In this case, the following structure is possible. A display layer 3 consisting of liquid crystal/polymer composite material is partially formed in the linear portions defining the paper sizes. An upper transparent electrode layer 4 is also partially formed corresponding to the display layer 3. A lower transparent electrode layer 2 is used as a common electrode. In this simple display example, the display structure and its drive circuit may be simple and low in cost.

The above useful effects of the invention can be obtained by the image reading devices with the display structures of the second and third embodiments as well as the image reading device with the display structure of the first embodiment.

In the image reading device according to one aspect of the invention, at least one of the electrodes consists of a plurality of divided electrodes, a liquid crystal panel of the transmission type in which liquid crystal/polymer composite material is sandwiched by the electrodes, is layered over the document table, and a gap between the adjacent divided electrodes is shorter than a minimum resolution distance in the display panel location of the image reading device. With such a construction, an area where a document is located can be distinctively displayed by a transparent portion where light is transmitted therethrough and an opaque portion where light is reflected. With a high transmittance in the transparent portion of the liquid crystal/polymer composite material, a document read sensitivity is prevented from being reduced. Since the gap between the adjacent divided electrodes is shorter than the minimum resolution distance in the display panel location of the image reading device, the image reading device can correctly read an image without missing out a part or parts of the image.

In the image reading device according to another aspect of the invention, at least one of the electrodes consists of a plurality of divided electrodes, a liquid crystal panel of the transmission type in which liquid crystal/polymer composite material is sandwiched by the electrodes, is layered over the document table, and the ends of the adjacent divided electrodes overlap with each other, with an insulating layer being layered therebetween. With such a construction, an area where a document is located can be distinctively displayed by a transparent portion where light is transmitted therethrough and an opaque portion where light is reflected. With a high transmittance in the transparent portion of the liquid crystal/polymer composite material, a document read sensitivity is prevented from being reduced. Since the ends of the adjacent divided electrodes overlap with each other as vertically viewed, the image reading device can correctly read an image without missing out a part or parts of the image.

In the image reading device according to still another aspect of the invention, at least one of the electrodes consists of a plurality of divided electrodes, a liquid crystal panel of the transmission type in which liquid crystal/polymer composite material is sandwiched by the electrodes, is layered over the document table, and an electrode layer is provided covering the gap between the adjacent divided electrodes in a state that an insulating layer is layered between the electrode layer and the gap. With such a construction, an area where a document is located can be distinctively displayed by a transparent portion where light is transmitted therethrough and an opaque portion where light is reflected. With a high transmittance in the transparent portion of the liquid crystal/polymer composite material, a document read sensitivity is prevented from being reduced. Since an electrode layer is additionally provided covering the gap between the adjacent divided electrodes in a state that an insulating layer is layered between the electrode layer and the gap, the image reading device can correctly read an image without missing out a part or parts of the image.

In the image reading device according to further aspect of the invention, a liquid crystal panel of the transmission type in which liquid crystal/polymer composite material is sandwiched by the electrodes, is layered over the document table, and a distance t between the display panel and the document table is: 3 mm≦t≦30 mm. With such a construction, an area where a document is located can be distinctively displayed by a transparent portion where light is transmitted therethrough and an opaque portion where light is reflected. With a high transmittance in the transparent portion of the liquid crystal/polymer composite material, a document read sensitivity is prevented from being reduced. Since the display panel is separated from the document receiving surface by a fixed distance, the display panel having an opaque state persistence is apart from the focal plane of the read optical system, so that the image reading device can correctly read an image without missing out a part or parts of the image. Since the display panel is separated from the document receiving surface by a fixed distance, the light scattering effect by the liquid crystal/polymer composite material is increased, thereby improving the masking performance.

The foregoing description of the preferred embodiments of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. In an image reading device of the type in which a display panel is laid over a document table and an image on an original document laid over the display panel is input through the display panel, a display panel comprising:

a liquid crystal panel of the transmission type in which liquid crystal/polymer composite material is sandwiched by electrodes, wherein at least one of the electrodes sandwiching the liquid crystal/polymer composite material comprises a plurality of divided electrodes, with a gap between adjacent divided electrodes said gap being less than a minimum resolution distance of the image reading device, said minimum resolution distance being the minimum distance between two points that is required for discriminately reading the two points.

2. The display panel according to claim 1, further comprising: a power source for applying a voltage to between the electrodes sandwiching the liquid crystal/polymer composite material in the liquid crystal panel; a switch section for connecting and disconnecting said power source to and from said electrodes; input means for receiving an instruction signal of a read document size and outputting a signal corresponding to the instruction signal; and control means for outputting to said switch section a pattern signal to apply a voltage to the electrodes in an area defined by the read document size, in response to the signal output from said input means.

3. The display panel according to claim 1, wherein a quantity of light reflected from the liquid crystal panel when no voltage is applied to the electrodes sandwiching the liquid crystal/polymer composite material is equal to or larger than a minimum quantity of light enabling the image reading device to perceive the reflected light as white.

4. In an image reading device of the type in which a display panel is laid over a document table and an image on an original document laid over the display panel is input through the display panel, a display panel comprising:

a liquid crystal panel of the transmission type in which liquid crystal/polymer composite material is sandwiched by electrodes, wherein at least one of the electrodes sandwiching the liquid crystal/polymer composite material comprises a plurality of divided electrodes, the ends of the divided electrodes overlapping each other with an insulating layer therebetween.

5. The display panel according to claim 4, further comprising: a power source for applying a voltage to between the electrodes sandwiching the liquid crystal/polymer composite material in the liquid crystal panel; a switch section for connecting and disconnecting said power source to and from said electrodes; input means for receiving an instruction signal of a read document size and outputting a signal corresponding to the instruction signal; and control means for outputting to said switch section a pattern signal to apply a voltage to the electrodes in an area defined by the read document size, in response to the signal output from said input means.

6. The display panel according to claim 4, wherein a quantity of light reflected from the liquid crystal panel when no voltage is applied to the electrodes sandwiching the liquid crystal/polymer copmosite material is equal to or larger than a minimum quantity of light enabling the image reading device to perceive the reflected light as white.

7. In an image reading device of the type in which a display panel is laid over a dcoument table and an image on an original document laid over the display panel is input through the display panel, a display panel comprising:

a liquid crystal panel of the transmission type in which liquid crystal/polymer composite material is sandwiched by electrodes, wherein at least one of the electrodes sandwiching the liquid crystal/polymer composite material comprises a plurality of divided electrodes, and wherein an electrode layer covers a gap between the adjacent divided electrodes with an insulating layer between the electrode layer and the gap.

8. The display panel according to claim 7, further comprising: a power source for applying a voltage to between the electrodes sandwiching the liquid crystal/polymer composite material in the liquid crystal panel; a switch section for connecting and disconnecting said power source to and from said electrodes; input means for receiving an instruction signal of a read document size and outputting a signal corresponding to the instruction signal; and control means for outputting to said switch section a pattern signal to apply a voltage to the electrodes in an area defined by the read document size, in response to the signal output from said input means.

9. The display panel according to claim 7, wherein a quantity of light reflected from the liquid crystal panel when no voltage is applied to the electrodes sandwiching the liquid crystal/polymer copmosite material is equal to or larger than a minimum quantity of light enabling the image reading device to perceive the reflected light as white.

10. An image reading device comprising:

a document table;

a display panel laid over the document table wherein an image on an original document laid over the display panel is input through the display panel and wherein the display panel includes a liquid crystal panel of the transmission type in which liquid crystal/polymer composite material is sandwiched by electrodes, such that a distance t between the display panel and the document table satisfies the following condition, $3 \text{ mm} \leq t \leq 30 \text{ mm}$.

11. The image reading device according to claim 10, further comprising: a power source for applying a voltage to between the electrodes sandwiching the liquid crystal/polymer composite material in the liquid crystal panel; a switch section for connecting and disconnecting said power source to and from said electrodes; input means for receiv ing an instruction signal of a read document size and outputting a signal corresponding to the instruction signal; and control means for outputting to said switch section a pattern signal to apply a voltage to the electrodes in an area defined by the read document size, in response to the signal output from said input means.

12. The image reading device according to claim 10, wherein a quantity of light reflected from the liquid crystal panel in a state that no voltage is applied to the electrodes sandwiching the liquid crystal/polymer composite material in the liquid crystal panel, is equal to or larger than a minimum quantity of light enabling the image reading device to perceive the reflected light as white.

13. The display panel according to claim 1 wherein the gap between adjacent divided electrodes is less than half the minimum resolution distance of the image reading device, said minimum resolution distance being the minimum distance between two points that is required for discriminately reading the two points.

* * * * *

UNITED STATES PATENT AND TRADEMARK OFFICE
CERTIFICATE OF CORRECTION

PATENT NO. : 5,742,709
DATED : April 21, 1998
INVENTOR(S) : Osamu UENO et al.

It is certified that error appears in the above-identified patent and that said Letters Patent is hereby corrected as shown below:

Claim 6, column 14, line 16, "copmosite" should read --composite--.

Claim 7, column 14, line 21, "dcoument" should read --document--.

Claim 9, column 14, line 47, "copmosite" should read --composite--.

Claim 11, column 14, line 67, "receiv" should read --receiv- --.

Signed and Sealed this

Thirteenth Day of July, 1999

Attest:

Q. TODD DICKINSON

*Attesting Officer*  Acting Commissioner of Patents and Trademarks